US011552362B2

(12) United States Patent
Penmetsa et al.

(10) Patent No.: US 11,552,362 B2
(45) Date of Patent: Jan. 10, 2023

(54) BATTERY CHARGING CIRCUIT INTEGRATED INSIDE BATTERY PACK

(71) Applicant: Ridge Tool Company, Elyria, OH (US)

(72) Inventors: Naga Penmetsa, Westlake, OH (US); Harald Krondorfer, Aurora, OH (US)

(73) Assignee: Ridge Tool Company, Elyria, OH (US)

( * ) Notice: Subject to any disclaimer, the term of this patent is extended or adjusted under 35 U.S.C. 154(b) by 407 days.

(21) Appl. No.: 16/684,797

(22) Filed: Nov. 15, 2019

(65) Prior Publication Data

US 2020/0161607 A1 May 21, 2020

(51) Int. Cl.
*H01M 50/20* (2021.01)
*H01M 10/0525* (2010.01)
*H02J 7/00* (2006.01)
*H01M 10/46* (2006.01)

(52) U.S. Cl.
CPC ....... *H01M 50/20* (2021.01); *H01M 10/0525* (2013.01); *H01M 10/46* (2013.01); *H02J 7/00* (2013.01); *H02J 7/0045* (2013.01)

(58) Field of Classification Search
CPC .. H01M 50/20; H01M 10/0525; H01M 10/46; H01M 2220/30; H01M 10/4257; H01M 2010/4271; H01M 2010/4278; H02J 7/00; H02J 7/0045; H02J 7/00032; H02J 7/00036; Y02E 60/10
USPC ............................................................ 429/7
See application file for complete search history.

(56) References Cited

U.S. PATENT DOCUMENTS

2010/0181966 A1* 7/2010 Sakakibara ......... H01M 10/443
320/136
2018/0294662 A1 10/2018 Polakowski et al.

\* cited by examiner

*Primary Examiner* — Gary D Harris
(74) *Attorney, Agent, or Firm* — Mark E. Bandy; Rankin Hill & Clark, LLP

(57) ABSTRACT

Battery charging systems having battery charging circuits are described. The battery charging circuit can be located within a battery housing. Alternatively, the battery charging circuit can be located within a charging shoe housing. Also described are power source modules. In addition, various methods of charging and discharging are described.

9 Claims, 15 Drawing Sheets

BATTERY CHARGING CIRCUIT INTEGRATED INSIDE BATTERY PACK

FIELD

The present subject matter relates to batteries and particularly lithium ion batteries and charging thereof. More particularly, the present subject matter relates to charging circuitry and battery packs, and enabling the battery pack to accept a charge without the need for a dedicated charger.

BACKGROUND

Many power tool batteries utilize a stand alone power source or charger capable of delivering a required charge to a battery. These chargers comprise a power cord which is typically connected to an AC power source or, less commonly, connected to a car outlet capable of delivering 12V DC. A charging circuit capable of converting the previously noted power source to a required charging power, is disposed within a housing capable of direct engagement to the appropriate corresponding battery. Known stand alone chargers are relatively large and require the exact corresponding charger circuit for proper charging. Therefore, a need remains for a battery that does not rely on a traditional charger and related charging method.

SUMMARY

The difficulties and drawbacks associated with previous approaches are addressed in the present subject matter as follows.

In one aspect, the present subject matter provides a battery charging system comprising a battery including at least one battery cell and a housing. The housing defines an interior region. The battery charging system also comprises a battery charging circuit, a battery management system, a microcontroller, a memory, and a charging port. The battery charging circuit is disposed in the interior region of the housing.

In another aspect, the present subject matter provides a battery charging system comprising a charging shoe housing including a battery terminal interface. The housing defines an interior region. The battery charging system also comprises a battery charging circuit, a microcontroller, a memory, and a charging port. The battery charging circuit is disposed in the interior region of the charging shoe housing.

In yet another aspect, the present subject matter provides a method of data transfer between a tool and a battery. The method comprises providing a battery including at least one battery cell, a housing defining an interior region, and a battery charging circuit disposed in the interior region of the housing. The method also comprises connecting the battery with a tool having provisions to transmit information relating to the tool or use of the tool. The method additionally comprises identifying the tool to which the battery is connected. The method further comprises transmitting the information from the tool to the battery. The method also comprises storing in the battery the transmitted information. The method also comprises processing the stored information in the battery. And, the method comprises storing the processed information in the battery.

In still a further aspect, the present subject matter provides a method of data transfer between a power adapter and a battery. The method comprises providing a battery including at least one battery cell, memory with stored information, a housing defining an interior region, and a battery charging circuit disposed in the interior region of the housing. The method also comprises connecting the battery with a power adapter. The battery includes provisions to identify the power adapter. The method further comprises identifying the power adapter to which the battery is connected. The method also comprises transferring electrical power from the power adapter to the battery to thereby charge the at least one battery cell. And, the method comprises transmitting the stored information from the memory of the battery to the power adapter.

In still another aspect, the present subject matter provides a method of data transfer between a power adapter and a battery. The method comprises providing a battery including at least one battery cell, a housing defining an interior region, memory with stored information, and a battery charging circuit disposed in the interior region of the housing. The method also comprises connecting the battery with a power adapter. The power adapter includes provisions to identify the battery. The method also comprises identifying the battery to which the power adapter is connected. The method further comprises transferring electrical power from the power adapter to the battery to thereby charge the at least one battery cell. The method additionally comprises transmitting the stored information from the memory of the battery to the power adapter. And, the method comprises the power adapter transferring the transmitted information to a remote server.

In yet another aspect, the present subject matter provides a battery charging system including a battery having at least one battery cell, a charging port, and a USB connector. The battery is configured such that only one of the port and the connector can be used at the same time.

In still another aspect, the present subject matter provides a battery charging system including a battery having at least one battery cell, a charging port, a USB connector, and switching provisions. The switching provisions (i) detect which of the charging port and the USB connector was first connected to external component(s), and (ii) disable the other.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
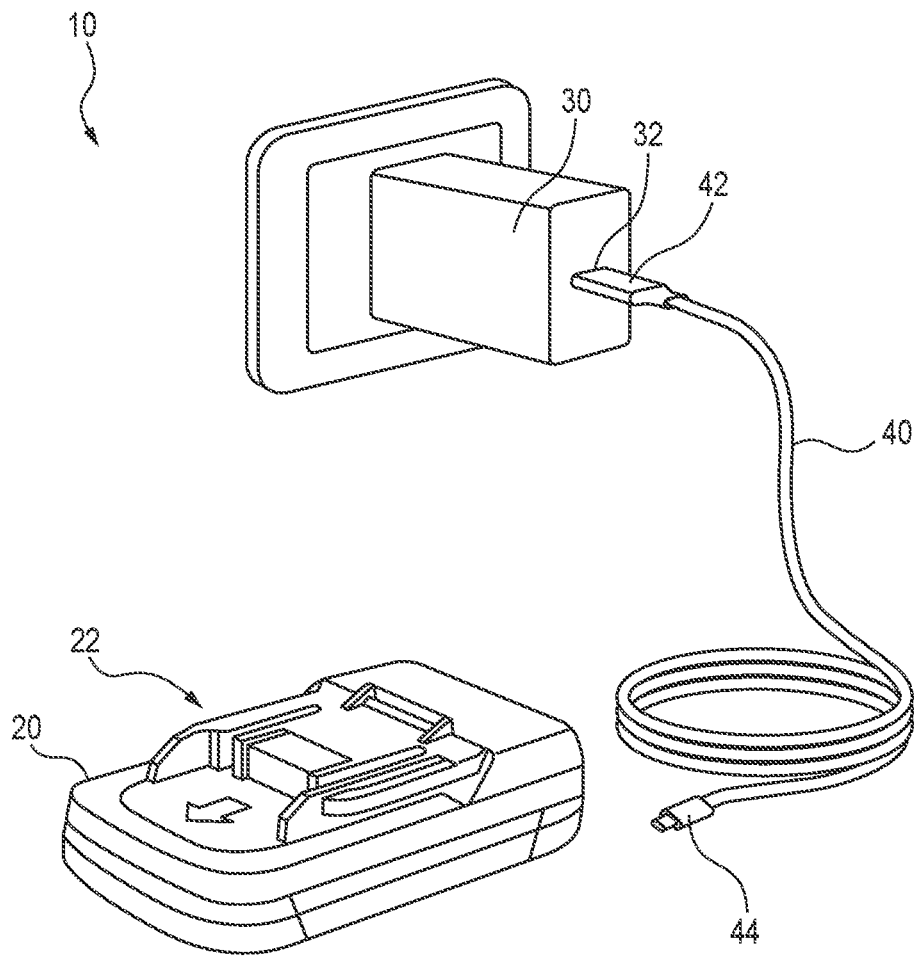
FIG. 1 illustrates a battery charging system with a battery housing in accordance with an embodiment of the present disclosure.

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a battery charging circuit integrated inside a battery pack.

Another object of the present disclosure is to provide a battery charging system which eliminates the use of traditional battery chargers in the market.

Still another object of the present disclosure is to provide a battery charging system that provides fast charging.

Still another object of the present disclosure is to provide a battery charging system which eliminates the use of traditional battery chargers to charge a battery.

Yet another object of the present disclosure is to provide a battery charging system that reduces the physical footprint of typical battery chargers that are in the market.

Still another object of the present disclosure is to provide a battery charging system that is convenient to use.

Other objects and advantages of the present disclosure will be more apparent from the following description, which is not intended to limit the scope of the present disclosure.

The present disclosure provides a system in which a battery charging circuit is integrated inside a battery pack or housing. In other versions, the charging circuit is integrated inside a battery charging shoe. These systems eliminate the use of traditional battery chargers in the market. In certain embodiments, the system reduces the physical footprint of typical battery chargers that are in the market. The system enables smart batteries to transfer tool data from a battery to a charger. In many embodiments, the battery charging and/or data transmission is performed through a connector such as a USB connector and particularly a USB-Type C Connector that is incorporated inside the battery pack or the charging shoe. An external wall outlet power adapter with a corresponding connector such as for example a USB-Type C Connector acts as the power source to the battery pack or the charging shoe.

The battery charging system, as provided in the present disclosure, typically has one or more of the following features:

An external power source is required to charge the battery. The power source typically has a USB output connector.

The USB controller, power conversion, battery management system and battery charging circuit are integrated into the battery or the battery charging shoe.

The battery pack or the battery charging shoe has a battery management system which can monitor various aspects of the battery or charging shoe and in particular monitor safety features of the battery or charging shoe.

The safety features are monitored by a microprocessor including cycle life, state of charge, and cell balancing.

The battery and/or the battery charging shoe has an internal memory to collect tool information, when connected to a tool providing such information. The battery and/or the battery charging shoe circuitry has a current sensing circuit, which samples the tool current information and stores that information in the internal memory.

When the tool is connected to the external power source through a USB connector for charging, the data collected from the tool is transferred to the external power source.

The external power source has wireless connectivity and sends data to one or more computers, servers, and/or to the cloud.

FIGS. 1-4 illustrate a battery charging system with several embodiments of a battery housing in accordance with the present disclosure. Specifically, FIG. 1 illustrates a battery charging system 10 comprising a battery and battery housing 20, a power adapter or power source module 30 including a connector port 32, and a cable 40 having corresponding connector ends 42 and 44. The battery 20 includes a connector port 22 along an exterior region of the battery 20 as described in greater detail herein. In the particular embodiment depicted in FIG. 1, the connector type is a USB-Type C Connector as known in the industry. However, the present disclosure is not limited to such and includes other connector types. In addition, although the battery charging system 10 as described herein and illustrated in FIG. 1 utilizes female receiving connector ports 32, 22 on the adapter and battery respectively, with male connector ends 42, 44 on the cable 40; it will be understood that the present disclosure includes reversal of one or both sets of male and female connectors. Thus, one or both ends of the cable could utilize female receiving ports with corresponding male connector ends on the power adapter and/or battery.

Figure 2:
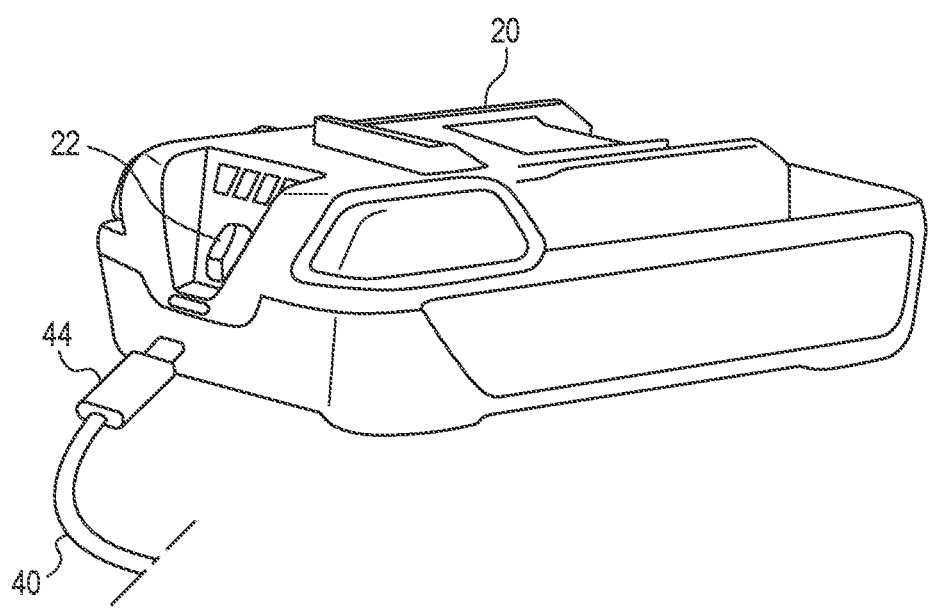
FIG. 2 illustrates another battery housing in accordance with an embodiment of the present disclosure.
Figure 3:
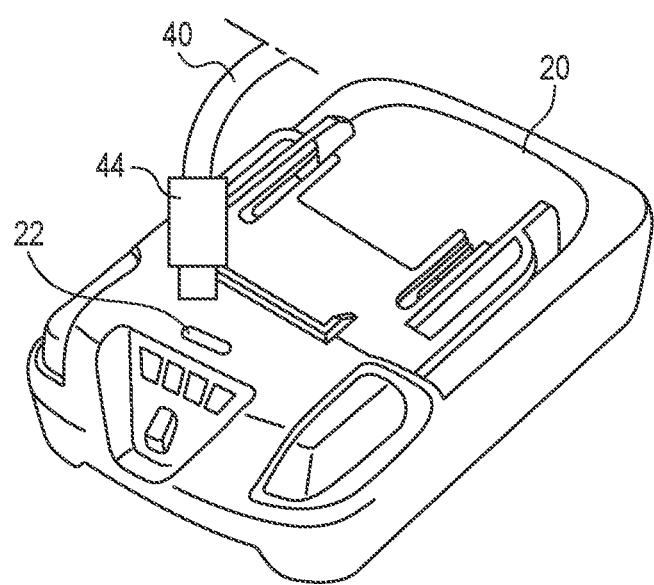
FIG. 3 illustrates still another battery housing in accordance with an embodiment of the present disclosure.
Figure 4:
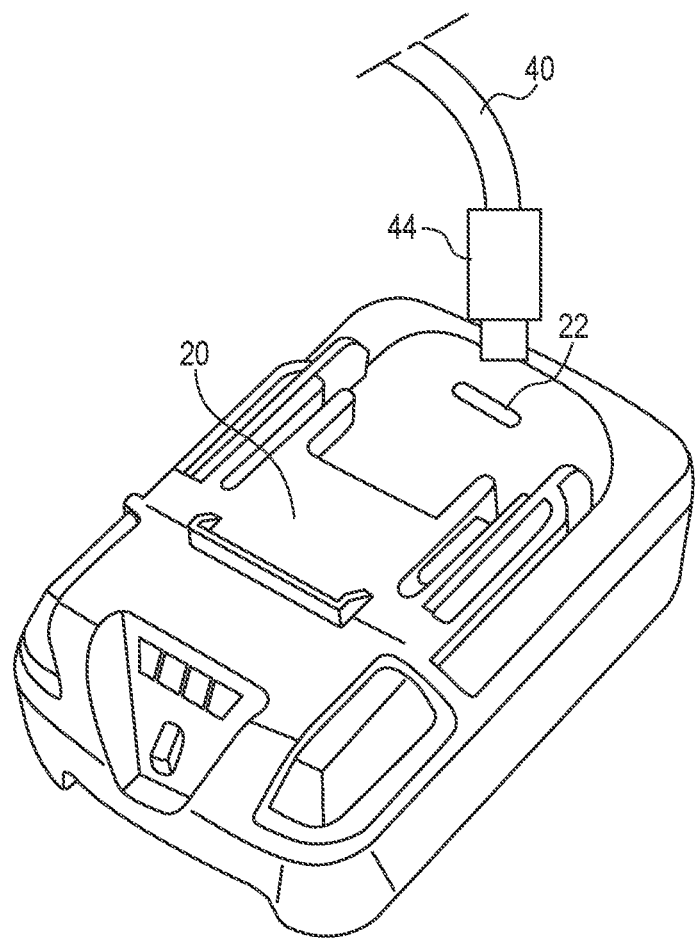
FIG. 4 illustrates yet another battery housing in accordance with an embodiment of the present disclosure.

FIGS. 2-4 illustrate representative potential locations for the connector port 22 located along an exterior region of the battery housing 20. It will be understood that the present disclosure is not limited to any of these representative port locations and instead includes nearly any location along the battery at which the port can be accessed and engaged with a corresponding connector end of a charging cable.

Figure 5:
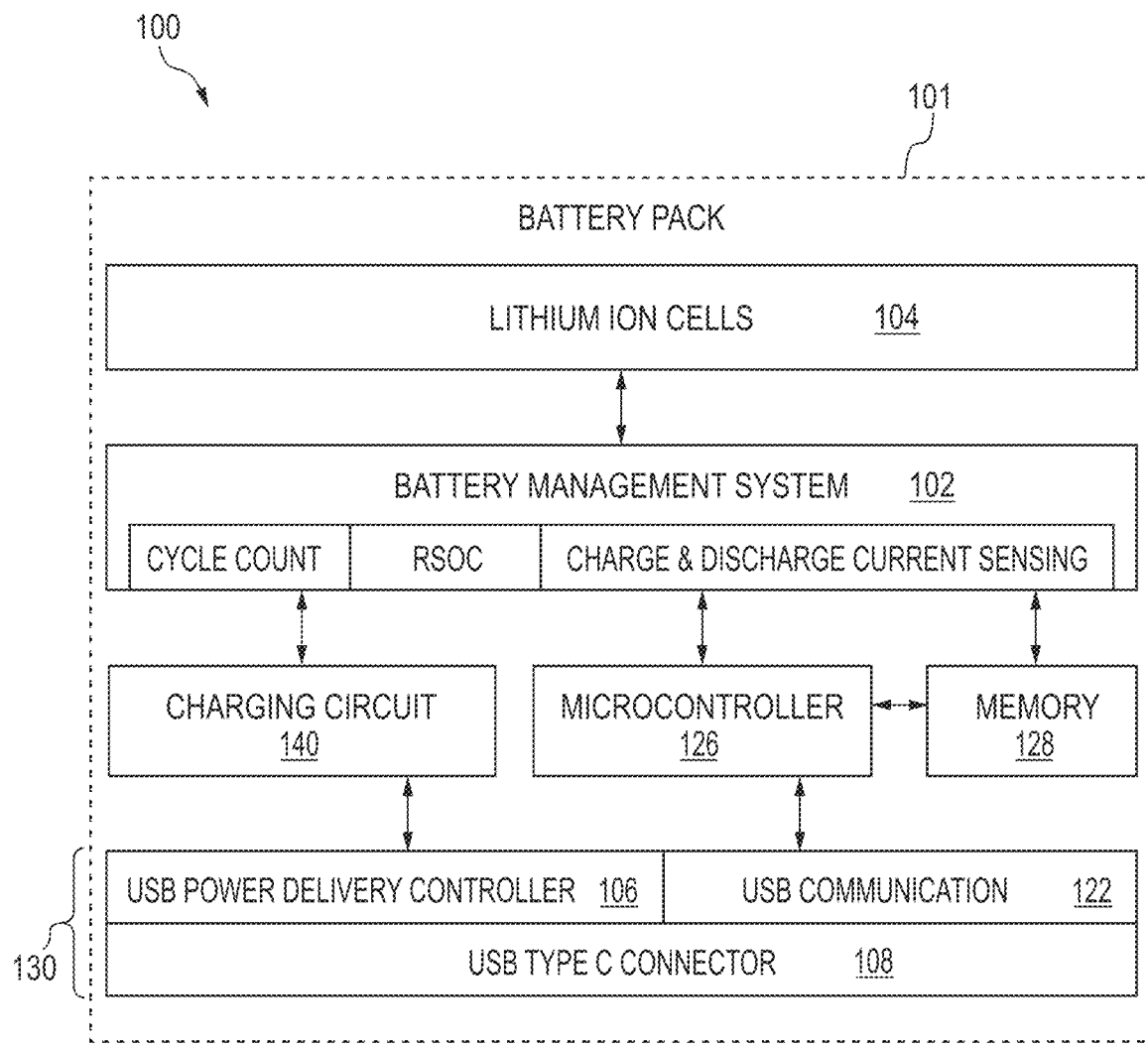
FIG. 5 illustrates a block diagram of a battery charging system including a battery with an integrated charging circuit, in accordance with an embodiment of the present disclosure.

The present disclosure also provides a battery charging system having an internal charging circuit. FIG. 5 illustrates a block diagram of a battery charging system 100 in which a charging circuit 140 is integrated within a battery 101 in accordance with an embodiment of the present disclosure. The battery 101 comprises a top housing and a bottom housing and defines an interior region. The interior region is sized and shaped for receiving and placement of the charging circuit assembly 140, a battery management system 102, at least one battery cell 104, a USB power delivery controller 106, and a charging port 130. The USB power delivery controller 106 may be included with the charging port 130. The battery 101 also comprises a microcontroller 126 and memory 128 disposed within the housing. The battery management system 102 typically includes provisions for monitoring and/or performing cycle count, relative state of charge (RSOC), and charge and discharge current sensing. The charging port 130 disposed in the battery housing is capable of accepting a USB-Type C Connector 108 but is not limited to that connection type. The charging port 130 typically includes USB communication provisions 122 and a USB Type C Connector 108. And in many versions, the battery comprises a tool connection interface for operable connection between a tool and the battery. The charging circuit assembly 140 is in electrical connection with the charging port 130 and the battery management system 102, thereby allowing the use of a USB-Type C Connector 108 or the like to provide the necessary power to charge the battery. The battery management system 102 is in electrical communication with the tool connection interface microcontroller(s) which may include or use microcontroller(s) and memory, thereby allowing discharge of the battery cell(s) to a tool. The battery may further comprises provisions for memory and information gathering which may be integrated in one or more of the circuits within the battery.

Figure 6:
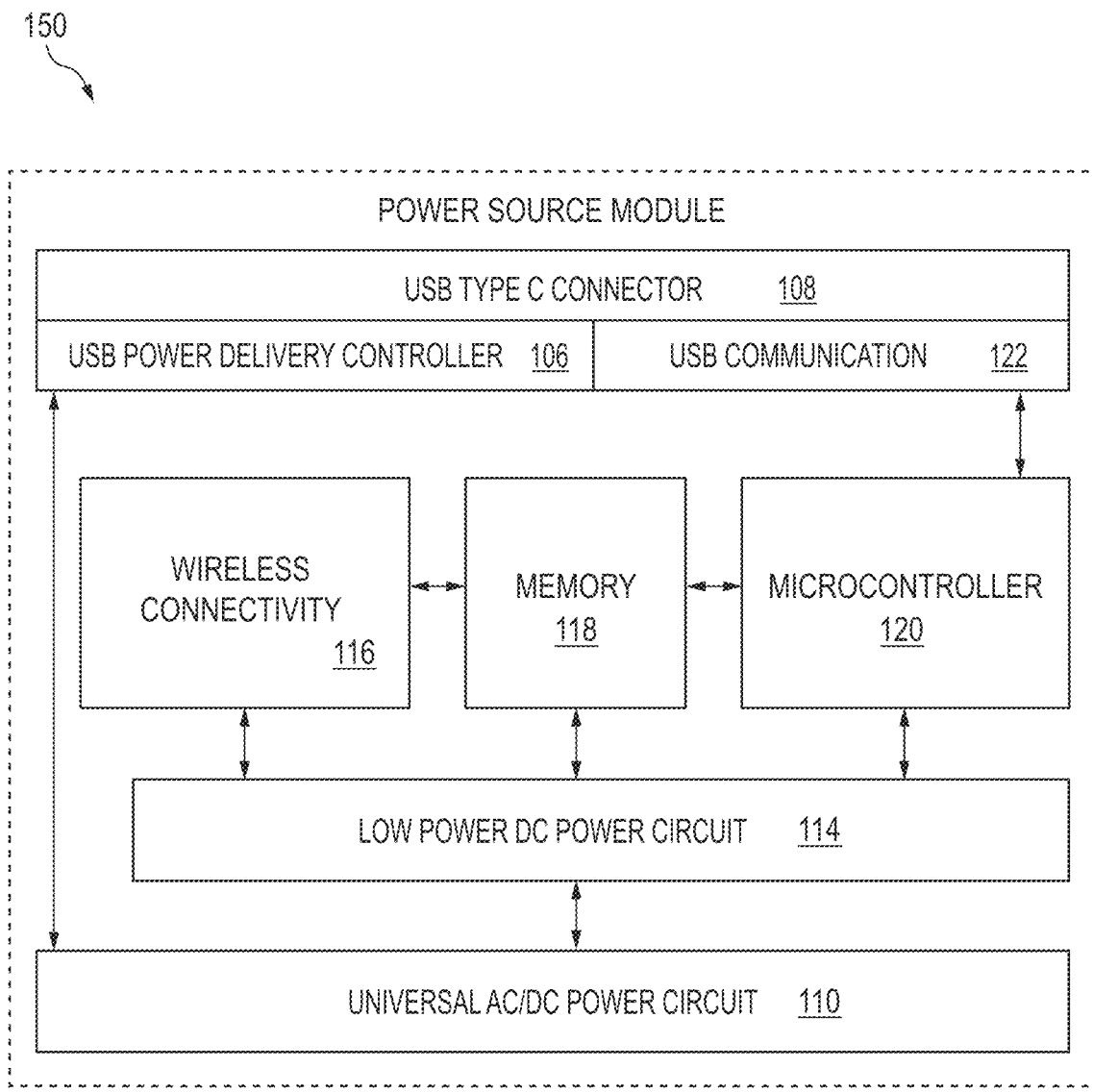
FIG. 6 illustrates a block diagram of a power source module in accordance with an embodiment of the present disclosure.

FIG. 6 illustrates a block diagram of a power source module or adapter 150 configured for use with the battery 101 in accordance with an embodiment of the present disclosure. Thus, the system 100 shown in FIG. 5 can further include the power source module system 150. The power source module or adapter 150 comprises a universal AC/DC power circuit 110 in electrical communication with a USB power delivery controller 106 and a low power DC power circuit 114. The low power DC power circuit 114 further comprises a wireless connectivity component 116, provisions for memory storage 118, and a microcontroller 120. The microcontroller 120 is in further communication with USB communication 122 coupled with the USB power delivery controller 106 and a USB connector 108. The USB connector 108 allows connection to the charging port provided on the battery.

Further, the system as provided by the present disclosure may include provisions to collect and withdraw tool information from the battery. Upon connection of the battery system to a tool that within itself can collect tool use information, the battery may selectively identify information to download and store within its memory provisions. Furthermore, upon connection of the battery to the power source, the power source may retrieve the tool use information and submit the information wirelessly to one or more host computers or servers and/or to the cloud.

Figure 7:
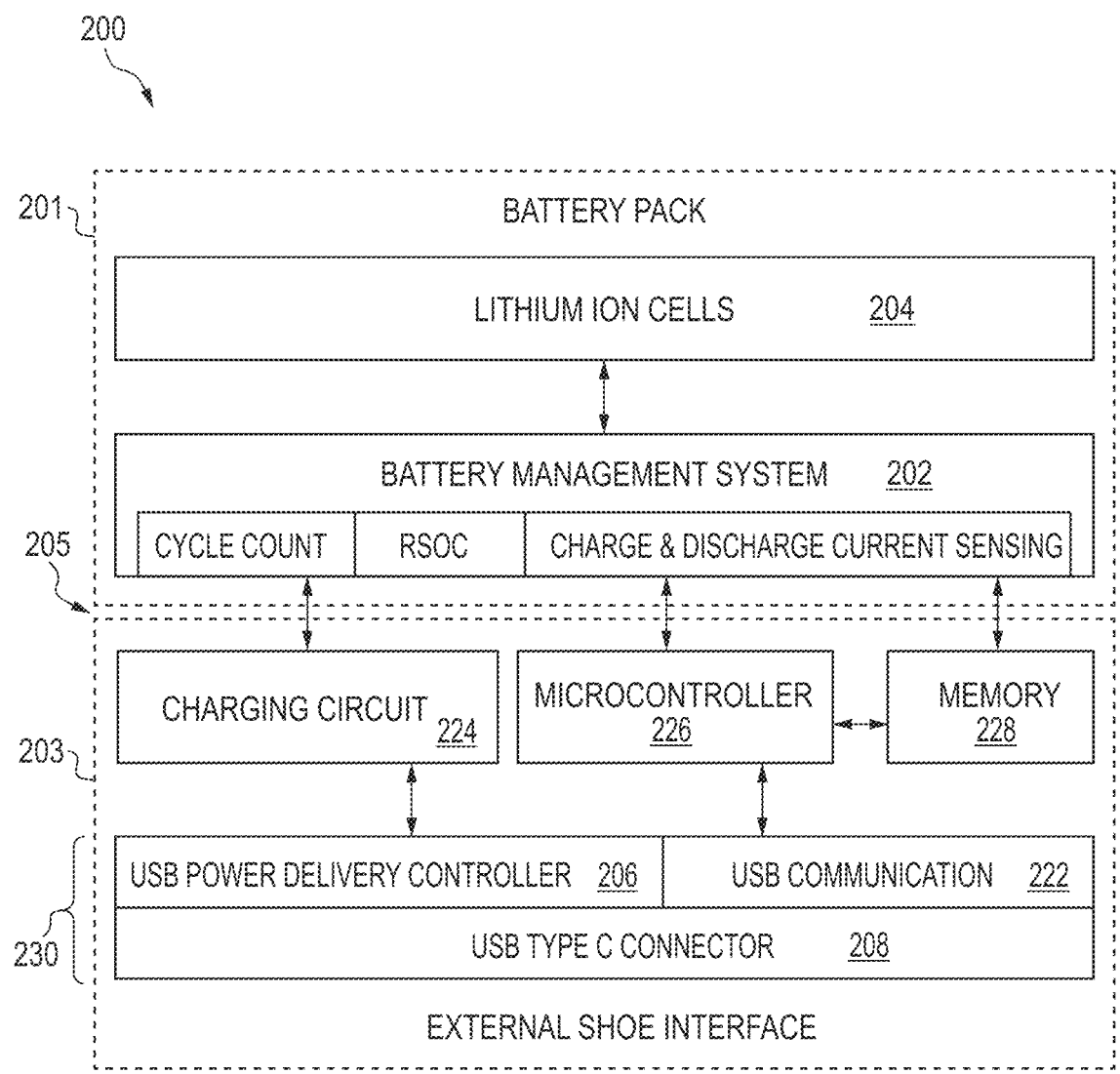
FIG. 7 illustrates a block diagram of a battery charging system including a battery with a charging circuit in an external shoe, in accordance with another embodiment of the present disclosure.

In another aspect shown in FIG. 7, the present subject matter provides a battery charging system 200 with an external charging shoe 203 for connection with existing batteries denoted as 201. FIG. 7 illustrates a block diagram of a battery charging system 200 in which a charging circuit 224 is integrated in an external shoe 203 in accordance with another embodiment of the present disclosure. The external charging shoe 203 comprises a housing with a battery terminal interface 205 and a defined inner region within the housing of the charging shoe sized and shaped for the charging circuit 224, a microcontroller 226, memory 228, and a connection or charging port 230. The charging shoe housing further defines on its exterior, an interface such as interface 205 for connection with a battery such as battery 201 and provides provisions for charging the existing battery 201. The charging circuit 224 is electrically connected to the shoe interface 205 and USB power delivery controller 206 and the connection port 230. The microcontroller 226 is in electrical communication with the shoe interface 205 and a USB communication 222 of the connection port 230. The battery 201 is slidably engageable with the shoe 203 to facilitate electrical communication from the shoe 203 to the battery 201 and provide electrical power transfer through the battery terminals generally shown as interface 205. The connection port 230 can include a USB type C Connector 208. The battery 201 typically includes one or more battery cells 204 and a battery management system 202. The battery management system 202 typically includes provisions for monitoring and/or performing cycle count, relative state of charge (RSOC), and charge and discharge current sensing.

Although the present subject matter is described with regard to batteries and battery packs using lithium ion cells, it will be understood that the present subject matter is not limited to such. Instead, the present subject matter may be used in association with other battery cell technologies.

Figure 8:
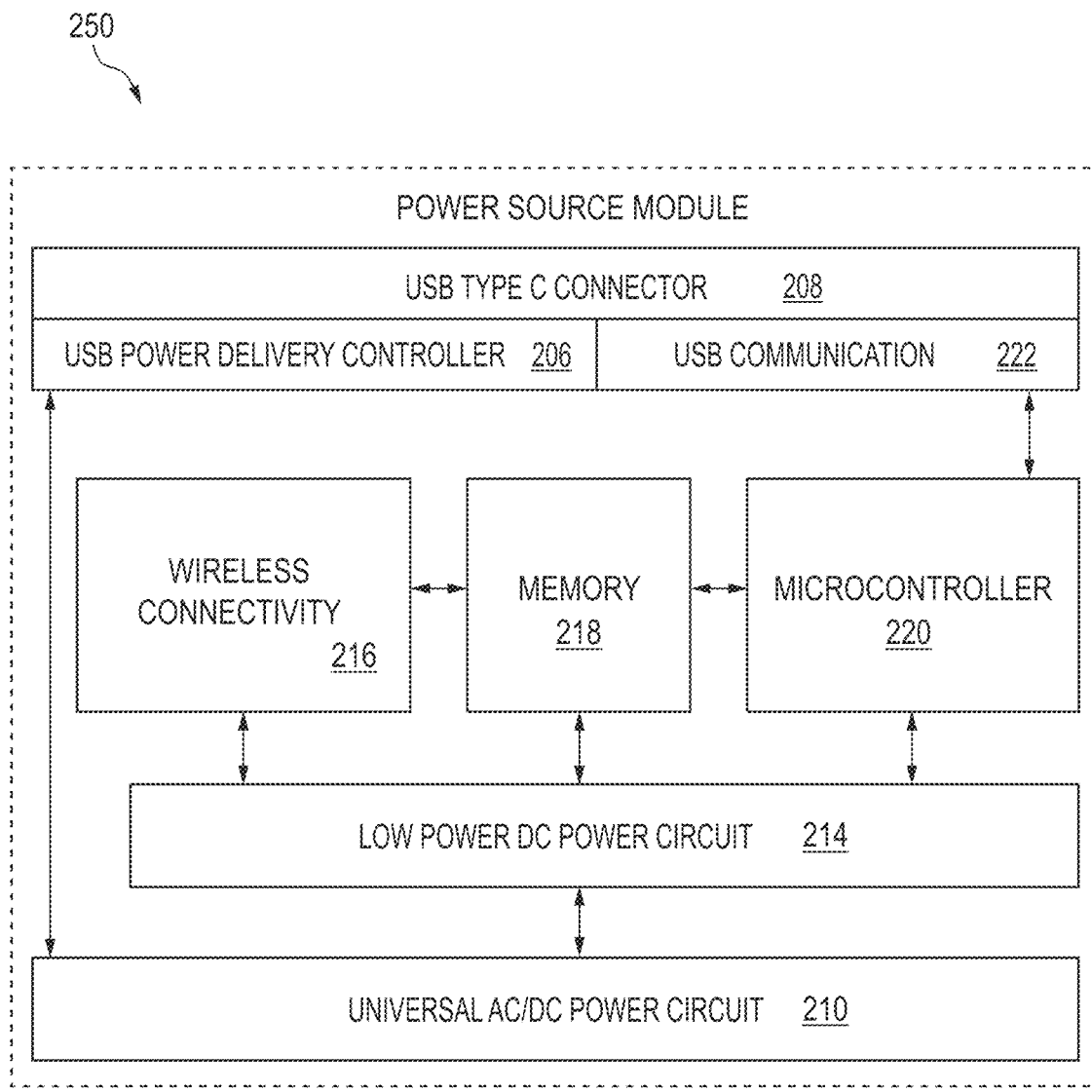
FIG. 8 illustrates a block diagram of a power source module in accordance with another embodiment of the present disclosure.

Furthermore, the charging system comprises a power source module or adapter 250 configured for use with the shoe 203. Thus, the system 200 shown in FIG. 7 can further include the power source module 250. FIG. 8 illustrates a block diagram of a power source module or adapter 250 in accordance with another embodiment of the present disclosure. The power source module 250 comprises a universal AC/DC power circuit 210 in electrical communication with a USB power delivery controller 206 and a low power DC power circuit 214. The low power DC power circuit 214 further comprises a wireless connectivity component 216, provisions for memory storage 218, and a microcontroller 220. The microcontroller 220 is in further communication with a USB communication 222 coupled with the USB power delivery controller 206 and a USB connector 208. The USB connector 208 allows connection to the charging port provided on the charging shoe 203.

The present subject matter also provides various methods of data transfer which may be accompanied with discharging and/or charging batteries using the battery charging systems and components thereof, as described herein. Generally, the method of data transfer with discharging comprises providing a battery typically as described herein. In many embodiments, the battery includes at least one battery cell, a housing with an interior region, and a battery charging circuit disposed within the battery housing. The methods also comprise connecting the battery with a tool having provisions to transfer or transmit information or data relating to the tool or use of the tool. The methods also comprise identifying the tool to which the battery is connected. The methods additionally comprise transmitting the information from the tool to the battery. The methods also comprise storing the transmitted information in the battery. Typically such information is stored in memory provisions of the battery. The methods further comprise processing the stored information in the battery. Typically, such processing is performed by microcontroller(s) in the battery. The methods may further comprise storing the processed information in the battery. Such information can be stored in memory provisions of the battery.

Generally, the method of data transfer with charging comprises providing a battery including at least one battery cell, memory with stored information, a housing defining an interior region, and a battery charging circuit disposed in the interior region of the housing. The method also comprises connecting the battery with a power adapter. The battery typically includes provisions for identifying the power adapter. The method comprises identifying the power adapter to which the battery is connected. The method also comprises transferring electrical power from the power adapter to the battery to thereby charge the at least one battery cell in the battery. The method also comprises transmitting the stored information from the stored information from the memory of the battery to the power adapter.

Generally, another method of data transfer with charging comprises providing a battery including at least one battery cell, memory with stored information, a housing defining an interior region, and a battery charging circuit disposed in the interior region of the housing. The method also comprises connecting the battery with a power adapter. Typically, the power adapter includes provisions to identify the battery. The method comprises identifying the battery to which the power adapter is connected. The method also comprises transferring electrical power from the power adapter to the battery to thereby charge the at least one battery cell. The method also comprises transmitting the stored information from the memory of the battery to the power adapter. The method also comprises the power adapter transferring the transmitted information to a remote server, or other processing component, or to the cloud.

Figure 9:
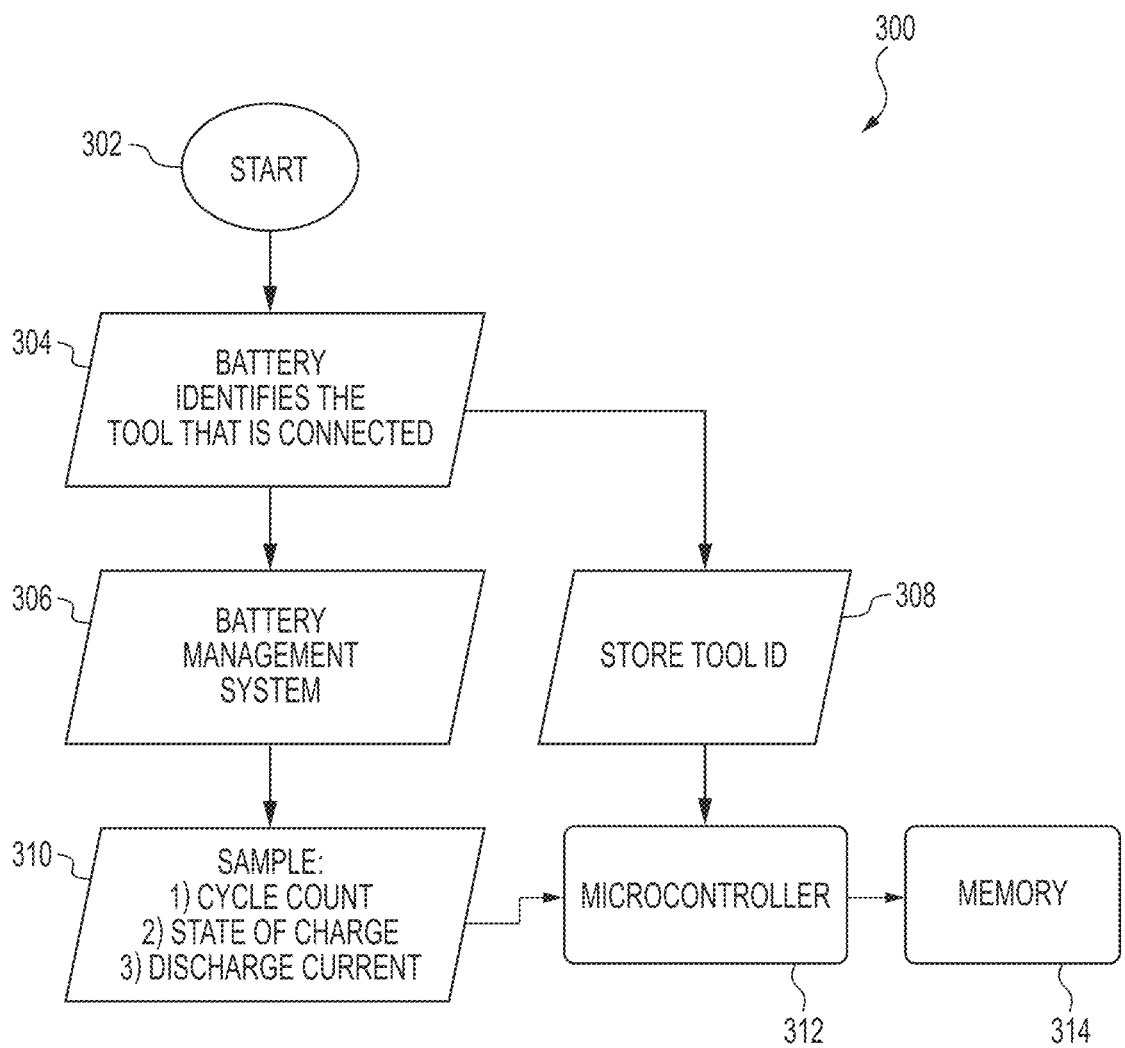
FIG. 9 illustrates a flowchart depicting discharging in accordance with an embodiment of the present disclosure.

FIG. 9 illustrates a flowchart depicting discharging and/or data transfer between a tool and a battery in accordance with an embodiment of the present disclosure. Specifically, FIG. 9 depicts a discharging and data transfer method 300 generally as follows. Upon actuation of the tool or connection between the tool and the battery generally shown as 302, the battery then identifies the tool to which the battery is connected. This is depicted as one or more operations 304. Next, the battery management system is then activated or otherwise initiated in operation(s) 306; and identification information relating to the particular tool is stored in the battery in operation(s) 308. Upon activation or initiation of the battery management system, circuitry or like provisions sample (i) cycle count(s), (ii) state of charge of the battery, and/or (iii) discharge current of the battery. Such sampling is performed in operation(s) 310. Information or data is forwarded to a microcontroller or like provisions for processing in one or more operation(s) 312. Processed information along with tool identification information is forwarded to memory in the battery in operation(s) 314.

Figure 10:
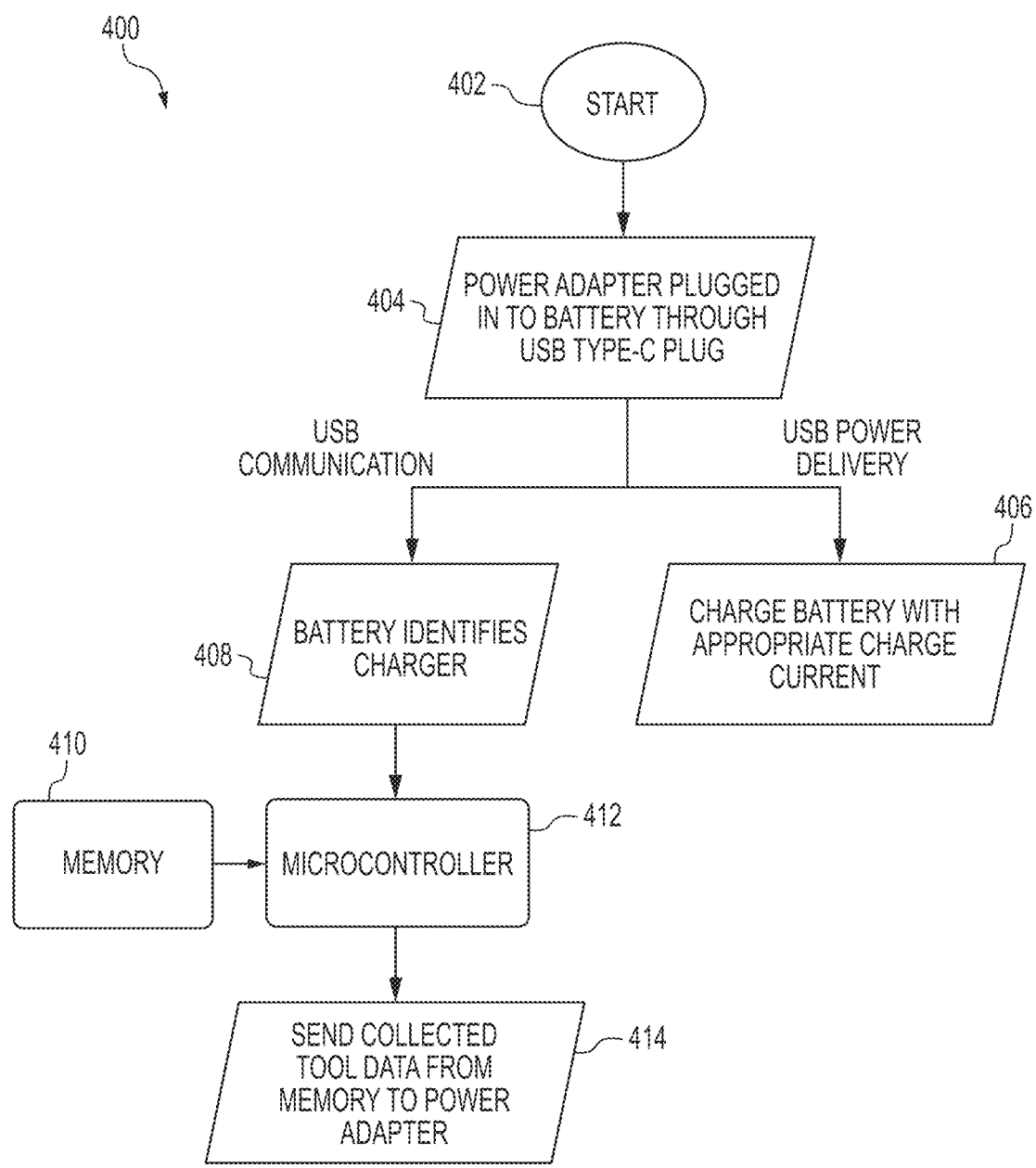
FIG. 10 illustrates a flowchart depicting charging in accordance with an embodiment of the present disclosure.

FIG. 10 illustrates a flowchart depicting charging and/or data transfer between a power adapter and a battery in accordance with an embodiment of the present disclosure. Specifically, FIG. 10 illustrates a charging and data transfer method 400 as follows. Upon actuation of the power adapter and/or connection between the power adapter and the battery generally shown as 402, and for applications using USB connectors, upon electrical communication between the power adapter and battery shown as 404, the charging method proceeds. Electrical power is transferred from the power adapter to the battery as shown by operation(s) 406. Information and/or data is also transferred between the power adapter and the battery. More specifically, in one or more operations, the battery identifies the particular charger to which it is connected in operation(s) 408. Information and/or data from memory in the battery or battery shoe is forwarded to a microcontroller or like provisions in operation(s) 410, 412. Processing and/or data collection by the battery may also be performed in operation(s) 412. The processed and/or collected data is forwarded to the power adapter in one or more operation(s) 414.

Figure 11:
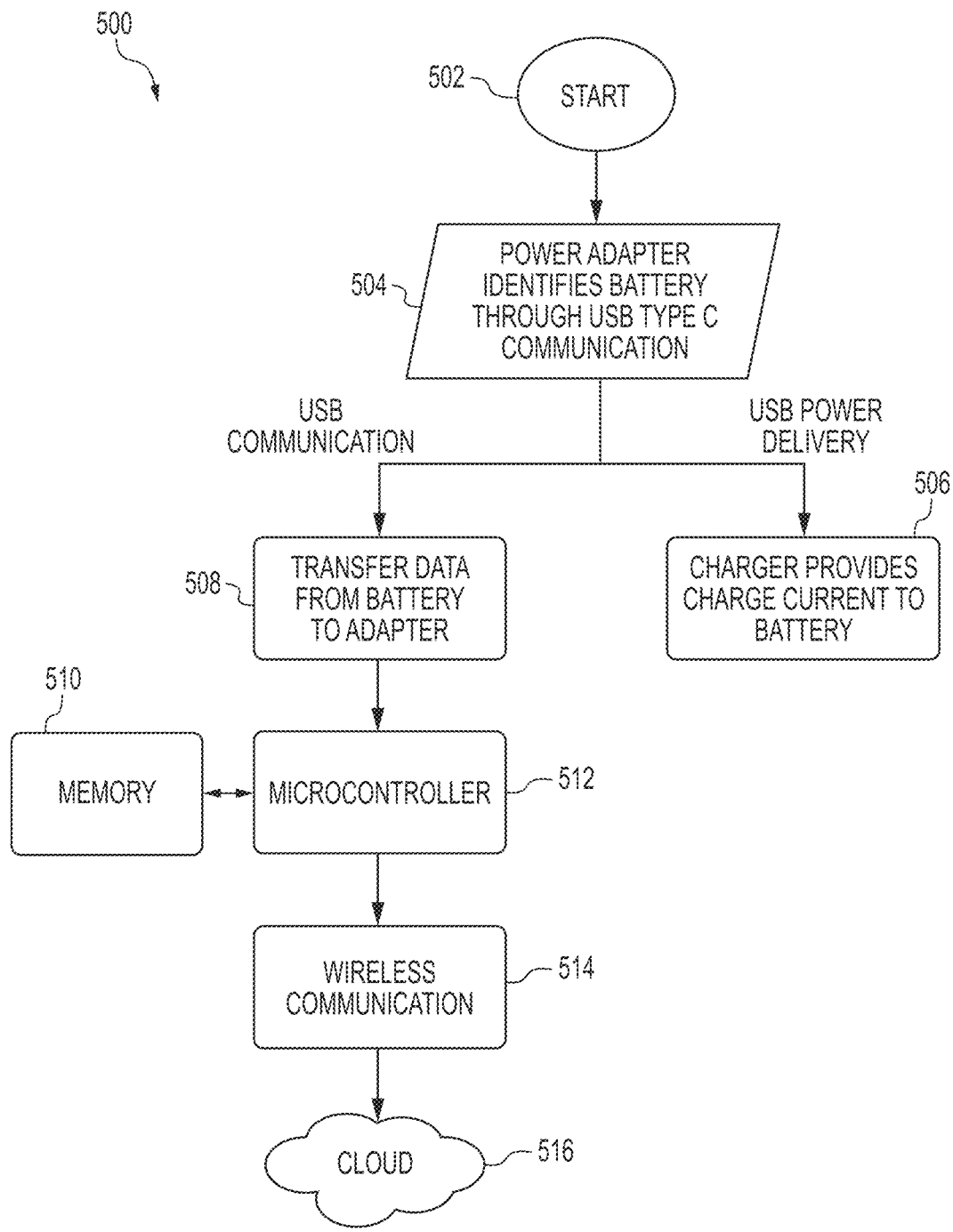
FIG. 11 illustrates a flowchart depicting charging in accordance with another embodiment of the present disclosure.

FIG. 11 illustrates a flowchart depicting charging and data transfer between a power adapter and a battery in accordance with another embodiment of the present disclosure. Specifically, FIG. 11 illustrates a charging and data transfer method 500. Upon actuation of the power adapter and/or connection between the power adapter and the battery generally shown as 502, and for applications using USB connectors, upon electrical communication between the power adapter and battery shown as 504, the charging method proceeds. Electrical power is transferred from the power adapter to the battery as shown by operation(s) 506. Information and/or data is also transferred between the power adapter and the battery. More specifically, in one or more operations, the battery forwards its information and/or data to the power adapter, denoted as operation(s) 508. Information and/or data from memory in the power adapter is forwarded to a microcontroller or like provisions in operation(s) 510, 512. Processing and/or data collection by the adaptor may also be performed in operation(s) 512. The processed and/or collected data is forwarded in operation(s) 514 to one or more remote computers, servers, and/or to the cloud generally denoted as 516. Preferably, such forwarding of information is performed wirelessly.

Figure 12:
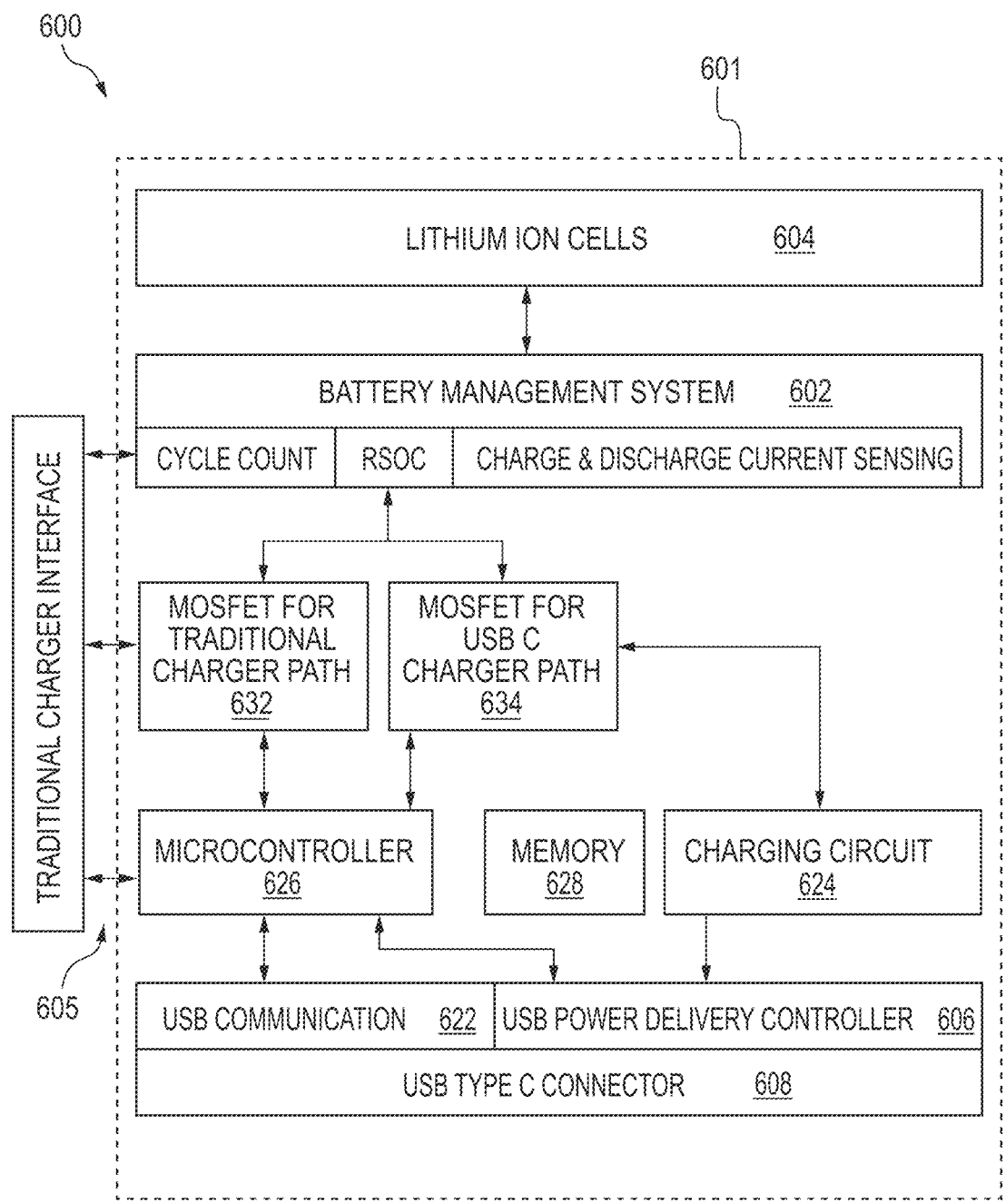
FIG. 12 illustrates a block diagram of a battery charging system in accordance with embodiment of the present disclosure.

In another aspect shown in FIG. 12, the present subject matter provides a battery charging system 600 with electrical isolation provisions. Specifically, FIG. 12 illustrates a battery pack with electrical isolation provisions, showing connection with a traditional battery charger and a USB type C connector plugged in or otherwise electrically connected to the battery pack at the same time. FIG. 12 illustrates a block diagram of a battery charging system 600 in which a charging circuit 624 is integrated in a battery pack 601 in accordance with another embodiment of the present disclosure. The battery pack 601 comprises a housing with a battery terminal interface 605 and a defined inner region within the housing of the battery pack sized and shaped for the charging circuit 624, a microcontroller 626, and memory 628. The battery pack housing further defines on its exterior, an interface such as interface 605 for connection with a traditional charger and provides provisions for charging the battery. The battery pack 601 also includes switching provisions 632 for governing charging of the battery cells 604 via a traditional charger interface; and switching provisions 634 for governing charging of the battery cells 604 via the USB type C connector 608. Typically, the switching provisions 632 and/or 634 are in the form of field effect transistor(s) and particularly metal oxide semiconductor field effect transistors (MOSFETs). The charging circuit 624 is electrically connected to the switching provisions 634 and USB power delivery controller 606. The microcontroller 626 is in electrical communication with the switching provisions 632, the switching provisions 634, the interface 605, the USB communication 622, and the USB power delivery controller 606. The battery pack 601 typically includes one or more battery cells 604 and a battery management system 602. The battery management system 602 typically includes provisions for monitoring and/or performing cycle count, relative state of charge (RSOC), and charge and discharge current sensing.

Figure 13:
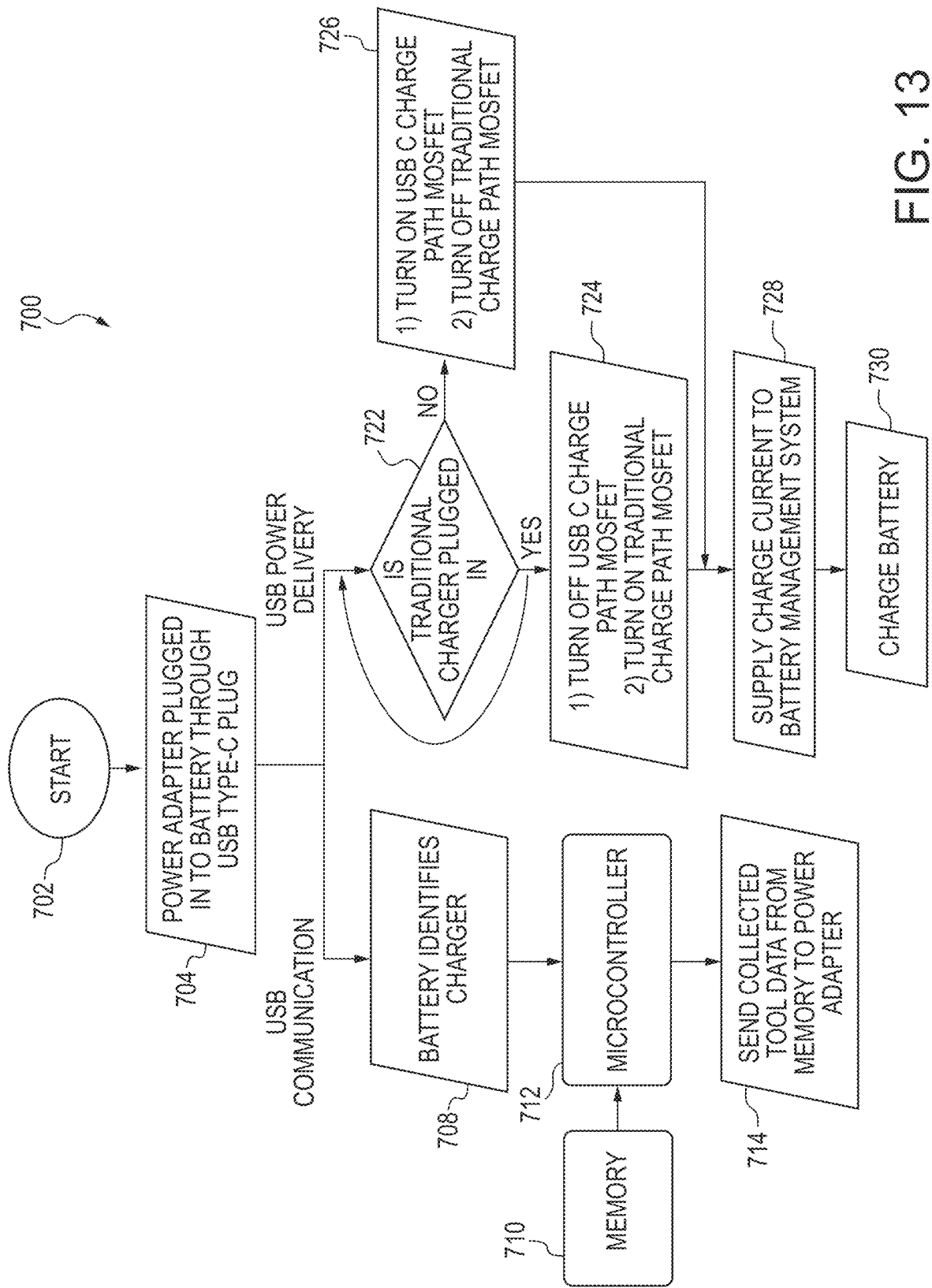
FIG. 13 illustrates a flowchart depicting charging in accordance with an embodiment of the present disclosure.

FIG. 13 illustrates a flowchart depicting charging and/or data transfer between a power adapter and a battery in accordance with an embodiment of the present disclosure. Specifically, FIG. 13 illustrates a charging and data transfer method 700 as follows. Upon actuation of the power adapter and/or connection between the power adapter and the battery generally shown as 702, and for applications using USB connectors, upon electrical communication between the power adapter and battery shown as 704, the charging method proceeds. Electrical power is transferred from the power adapter to the battery. Information and/or data is also transferred between the power adapter and the battery. More specifically, in one or more operations, the battery identifies the particular charger to which it is connected in operation(s) 708. Information and/or data from memory in the battery or battery shoe is forwarded to a microcontroller or like provisions in operation(s) 710, 712. Processing and/or data collection by the battery may also be performed in operation(s) 712. The processed and/or collected data is forwarded to the power adapter in one or more operation(s) 714. Transfer of electrical power is governed by operation(s) 722, 724, 726, 728, and 730. Specifically, in operation 722 the battery assesses whether a traditional charger is plugged in or otherwise electrically connected to the battery. If yes, the switching provisions of the battery turn off or electrically isolate the USB charge path, i.e., using the switching provisions 634 described in association with FIG. 12, and turn on or enable the traditional charge path, i.e., using the switching provisions 632 described in association with FIG. 12. These operation(s) are denoted as 724. If no traditional charger is connected to the battery, the switching provisions of the battery turn on or enable the USB charge path, i.e., using the switching provisions 634, and turn off or electrically isolate the traditional charge path, i.e., using the switching provisions 632. These operation(s) are denoted as 726. In operation 728, charge current is supplied to the battery management system. And, in 730, the battery cell(s) are charged.

In certain embodiments, a USB charging port is provided on a battery pack and particularly within the interior of the battery pack and in electrical communication with the battery pack's interface to the tool or traditional charger. This configuration allows the battery to physically connect either to a tool or the USB connector (either to the traditional charger or the USB connector), but not to both at the same time. For example, FIGS. 4 and 5 show this feature. If the battery is plugged into a tool or traditional charger, the USB port, e.g., USB type C connector, is not accessible to a user and thus prevents the user from connecting to both at the same time.

Figure 14:
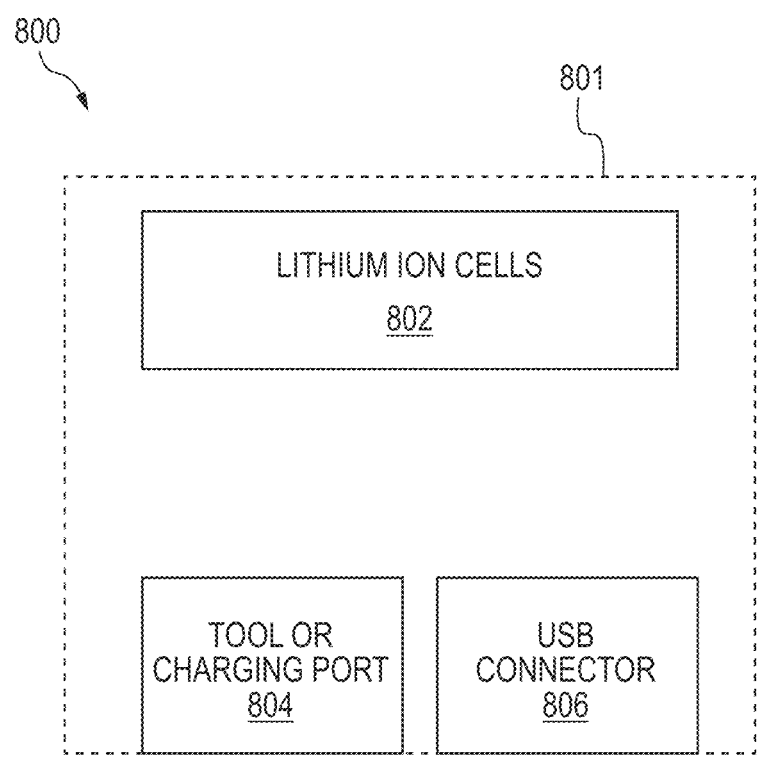
FIG. 14 illustrates a block diagram of a battery charging system in accordance with an embodiment of the present disclosure.

FIG. 14 illustrates an embodiment of a battery charging system 800 comprising a battery pack 801 including one or more battery cells such as lithium ion cells 802, a tool or charging port 804, and a USB connector 806. The tool or charging port 804 and the USB connector 806 are arranged and/or located on the battery pack 801 such that only one of the port 804 and the USB connector 806 can be used or accessed at a time. Restated, the port 804 and the USB connector 806 can not be used concurrently or accessed at the same time. In certain versions, the USB charging port is positioned on interior region(s) of the interface of the battery pack to tool or traditional charger.

Figure 15:
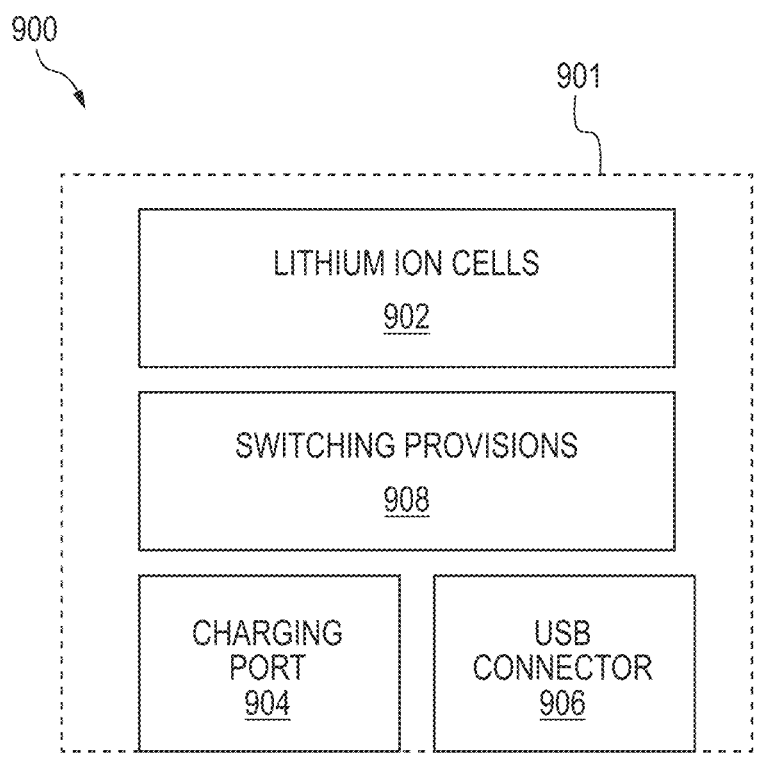
FIG. 15 illustrates a block diagram of a battery charging system in accordance with an embodiment of the present disclosure.

FIG. 15 illustrates an embodiment of a battery charging system 900 comprising a battery pack 901 including one or more battery cells such as lithium ion cells 902, a charging port 904, and a USB connector 906. The battery pack 901 also includes switching provisions 908. The switching provisions are configured to detect which of the charging port 904 and the USB connector 906 was first connected to an external component; and then to disable the other, i.e., the charging port 904 or the USB connector 906. In certain versions, the switching provisions are configured to enable the charging port and disable the USB connector if both are connected to corresponding external components at the same time. Thus, if a user plugs in both chargers at the same time, the traditional charger takes priority and the USB charger is disabled or turned off.

Further the system may optionally include provisions to collect and withdraw information from the battery. Upon connection of the battery to the external charging shoe, the power source may retrieve the battery information and submit the information wirelessly to a host or cloud.

The system may employ one or more charging strip(s) with USB type C plugs so that the user can charge multiple batteries at the same time.

The present disclosure described herein has several technical advantages including, but not limited to, the realization of a battery charging system that eliminates the use of traditional battery charges in the market; provides fast charging; eliminates the use of traditional battery chargers to charge a battery; reduces physical footprint of typical battery chargers that are in the market; and is convenient to use.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "mounted on," "engaged to," "connected to," or "coupled to" another element, it may be directly on, engaged, connected or coupled to the other element. As used herein, the term "and/or" includes any and all combinations of one or more of the associated listed elements.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A battery charging system comprising:
    a battery including at least one battery cell and a housing, the housing defining an interior region;
    a battery charging circuit;
    a battery management system;
    a microcontroller;
    a charging port;
    a power source module including:
    an AC/DC power circuit;
    a USB power delivery controller;
    a low power DC power circuit, the low power DC power circuit including (i) a wireless connectivity component, (ii) provisions for memory storage, and (iii) a microcontroller;
    wherein the battery charging circuit is disposed in the interior region of the housing.

2. The battery charging system of claim 1 wherein the at least one battery cell includes a lithium ion cell.

3. The battery charging system of claim 1 wherein the battery management system, the microcontroller, and the provisions for memory storage are disposed in the interior region of the housing.

4. The battery charging system of claim 1 wherein the charging port is accessible along an exterior region of the battery.

5. The battery charging system of claim 1 wherein the charging port is configured to connect with a USB-Type C Connector.

6. The battery charging system of claim 1 wherein the power source module further includes:
    a USB connector;
    USB communication provisions.

7. The battery charging system of claim 1 wherein
    the battery further includes a USB connector and switching provisions;
    wherein the switching provisions (i) detect which of the charging port and the USB connector was first connected to external components, and (ii) disable the other.

8. The battery charging system of claim 7 wherein if the charging port and the USB connector were connected to external components at the same time, the switching provisions enable the charging port and disable the USB connector.

9. The battery charging system of claim 1 wherein the provisions for memory storage are for storing information and data.

* * * * *